US009927088B2

(12) United States Patent
Puente et al.

(10) Patent No.: US 9,927,088 B2
(45) Date of Patent: Mar. 27, 2018

(54) HEAT SINK FOR LIGHTING MODULE, AND ASSOCIATED LIGHTING MODULE AND LIGHTING DEVICE

(71) Applicant: Valeo Vision, Bobigny (FR)

(72) Inventors: Jean-Claude Puente, Livry Gargan (FR); Vincent Godbillon, Paris (FR)

(73) Assignee: VALEO VISION, Bobigny (FR)

( * ) Notice: Subject to any disclaimer, the term of this patent is extended or adjusted under 35 U.S.C. 154(b) by 14 days.

(21) Appl. No.: 15/171,071

(22) Filed: Jun. 2, 2016

(65) Prior Publication Data

US 2016/0356448 A1 Dec. 8, 2016

(30) Foreign Application Priority Data

Jun. 8, 2015 (FR) ...................................... 15 55192

(51) Int. Cl.

*B60Q 1/00* (2006.01)
*B60Q 1/26* (2006.01)
*F21S 8/10* (2006.01)
*F21V 29/83* (2015.01)

(52) U.S. Cl.

CPC ........... *F21S 48/328* (2013.01); *F21S 48/332* (2013.01); *F21S 48/1233* (2013.01); *F21S 48/2212* (2013.01); *F21S 48/33* (2013.01); *F21V 29/83* (2015.01)

(58) Field of Classification Search

CPC .... B60Q 1/00; B60Q 1/26; B60Q 3/00; F21V 21/28; F21V 21/29; F21V 33/00; B62J 6/00; F21S 6/00

USPC ................ 362/487, 459, 294, 257, 465, 475

See application file for complete search history.

(56) References Cited

U.S. PATENT DOCUMENTS

| | | | | |
|---|---|---|---|---|
| 7,461,951 | B2 | 12/2008 | Chou et al. | |
| 8,297,805 | B2 | 10/2012 | Roucoules et al. | |
| 8,382,353 | B2 | 2/2013 | Tominaga et al. | |
| 2006/0181894 | A1* | 8/2006 | Chinniah | F21S 48/328 362/547 |
| 2007/0091632 | A1* | 4/2007 | Glovatsky | B60Q 1/0052 362/547 |
| 2007/0115656 | A1 | 5/2007 | Chou et al. | |
| 2007/0127257 | A1* | 6/2007 | Erion | F21S 48/1159 362/547 |

(Continued)

FOREIGN PATENT DOCUMENTS

| | | | |
|---|---|---|---|
| EP | 2199669 | A1 | 6/2010 |
| FR | 3001524 | A1 | 8/2014 |

(Continued)

*Primary Examiner* — Edwyn Labaze

(74) *Attorney, Agent, or Firm* — Oblon, McClelland, Maier & Neustadt, L.L.P.

(57) ABSTRACT

A heat sink for an automobile lighting module comprising a duct running across the heat sink, intended to circulate air from a first opening of the heat sink toward a second opening of the heat sink, the duct comprising at least one circulation chamber, the at least one circulation chamber comprising an air inlet and an air outlet, offset from each other, the duct further comprising at least one deflection means defining, within the circulation chamber, at least one air deflection baffle (C1, C2) for air circulating between the air inlet and the air outlet of the circulation chamber. A lighting module and vehicle lighting device.

20 Claims, 2 Drawing Sheets

(56) References Cited

U.S. PATENT DOCUMENTS

| | | | | |
|---|---|---|---|---|
| 2009/0089085 | A1* | 4/2009 | Schoenberg | G06F 19/327 705/2 |
| 2009/0196064 | A1* | 8/2009 | Kracker | B60Q 1/0017 362/547 |
| 2009/0303742 | A1* | 12/2009 | Yasuda | F21S 48/1159 362/547 |
| 2010/0157606 | A1 | 6/2010 | Roucoules et al. | |
| 2010/0246177 | A1* | 9/2010 | Van De Ven | F21S 48/325 362/249.02 |
| 2011/0216286 | A1* | 9/2011 | Matsumoto | G02B 6/0008 353/52 |
| 2011/0242833 | A1 | 10/2011 | Tominaga et al. | |
| 2012/0162983 | A1* | 6/2012 | Pickholz | F21V 29/51 362/235 |
| 2014/0254153 | A1* | 9/2014 | Vissenberg | F21V 7/0016 362/235 |
| 2016/0039330 | A1* | 2/2016 | Rosenhahn | B60Q 1/06 362/512 |
| 2016/0195233 | A1* | 7/2016 | Lin | F21S 48/1154 362/516 |

FOREIGN PATENT DOCUMENTS

| | | | |
|---|---|---|---|
| JP | 2010108637 | A | 5/2010 |
| WO | 2013001560 | A1 | 1/2013 |

* cited by examiner

HEAT SINK FOR LIGHTING MODULE, AND ASSOCIATED LIGHTING MODULE AND LIGHTING DEVICE

CROSS-REFERENCE TO RELATED APPLICATIONS

This application claims priority to the French application 1555192 filed on Jun. 8, 2015, which application is incorporated herein by reference and made a part hereof.

BACKGROUND OF THE INVENTION

1. Field of the Invention

The present invention relates to lighting devices for vehicles.

2. Description of the Related Art

An important aspect relating to the design of these devices is to avoid the devices being subjected to the formation of condensation misting on the internal face of closing glass which the devices comprise, and also to avoid the accumulation of dust and deposits thereon.

To this end, it is feasible, for example, to provide the housings of these devices with a ventilation orifice which contributes in particular to ensuring good ventilation in the interior volume thereof.

However, there are drawbacks with such a procedure. Specifically, the presence of a ventilation orifice contributes to increasing the number of possible locations through which moisture and dust are likely to enter, which limits the advantage of such an orifice and promotes penetration of dust into the enclosure of these devices.

SUMMARY OF THE INVENTION

The invention is therefore intended to improve the situation.

To this end, the invention relates to a heat sink for a lighting module for an automobile, comprising a duct running across the heat sink, intended for circulating air from a first opening of the heat sink toward a second opening of the heat sink, the duct comprises at least one circulation chamber, the or each chamber comprising an air inlet and an air outlet, offset from each other, the duct further comprising at least one deflection means defining, within the circulation chamber, at least one baffle for deflecting air circulating between the air inlet and the air outlet of the circulation chamber.

According to another aspect of the invention, the heat sink comprises:

- a base extending along a longitudinal axis and comprising two opposing faces along the longitudinal axis, including an upstream face and a downstream face; and
- cooling fins extending from the upstream face, the downstream face being intended to receive a light source, the first and second openings being respectively arranged on the upstream face and the downstream face of the heat sink.

The cooling fins are parallel, longitudinal extensions of the heat sink, allowing better heat exchange between the air and the heat sink, and also better air circulation.

The cooling fins and the heat sink are formed as a single piece.

According to another aspect of the invention, at least a part of the air inlet and at least a part of the air outlet are facing each other.

The term "facing" should be understood as meaning the orthogonal projection of at least a part of the air inlet along an axis orthogonal to the walls of the circulation chamber and the orthogonal projection of at least a part of the air outlet along the same orthogonal axis.

According to another aspect of the invention, the air inlet and the air outlet are not provided facing each other.

According to another aspect of the invention, the heat sink comprises two washers, delimiting therebetween the circulation chamber, the washers each comprising a recess forming the air inlet, respectively the air outlet, of the circulation chamber.

According to another aspect of the invention, the heat sink comprises a base extending along a longitudinal axis, the air inlet and the air outlet of the circulation chamber being angularly offset at a given angle about the longitudinal axis, the given angle corresponding to the smaller of the two possible angles of between 0 and $2\pi$ radians, the projection on a normal plane to the axis of the air path imposed by the baffle covering an angular sector having an angle substantially equal to $2\pi-\alpha_i$ or greater than $2\pi-\alpha_i$, where $\alpha_i$ is the given angle and i is an index indexing the relevant chamber.

According to another aspect of the invention, the deflection means comprises a profile extending between the washers and defining the baffle, the profile comprising at least one partition wall arranged in the angular sector defined in a normal projection with respect to the axis by the air inlet and the air outlet of the circulation chamber and having the given angle $\alpha_i$, and at least one deflection wall extending outside of the angular sector and spaced apart from the air inlet and the air outlet of the circulation chamber in a projection on a normal plane to the longitudinal axis.

The term "profile" should be understood as meaning a shape extending along a given direction and having a constant cross section along the direction.

According to another aspect of the invention, the heat sink comprises a plurality of circulation chambers each comprising an air inlet and an air outlet, the deflection means defining within some or all of the circulation chambers an air deflection baffle.

According to another aspect of the invention, the heat sink extends along a longitudinal axis, each chamber within which is delimited a baffle is axially delimited by two washers of the heat sink, each washer comprising a recess forming an air inlet or an air outlet for the relevant circulation chamber, the air inlet and the air outlet being angularly offset by a given angle about the axis of the heat sink, the given angle corresponding to the smaller of the two possible angles of between 0 and $2\pi$ radians, the projection on a normal plane to the axis of the air path imposed by the baffle covering an angular sector having an angle substantially equal to $2\pi-\alpha_i$ or greater than $2\pi-\alpha_i$, where $\alpha_i$ is the given angle and i is an index indexing the relevant chamber.

According to another aspect of the invention, the deflection means comprises, for each chamber comprising an air deflection baffle, a profile extending between the washers delimiting the relevant chamber and defining the corresponding deflection baffle, the profile comprising at least one partition wall arranged in the angular sector defined in a normal projection with respect to the axis by the air inlet and the air outlet of the corresponding circulation chamber and having the given angle $\alpha_i$ between the associated recesses, and at least one deflection wall extending outside of the angular sector and spaced apart from the air inlet and from the air outlet of the circulation chamber in a projection on a normal plane to the axis of the heat sink.

According to another aspect of the invention, each recess is arranged at the periphery of the corresponding washer.

According to another aspect of the invention, the heat sink comprises cooling fins.

According to another aspect of the invention, the first opening is disposed between the cooling fins.

According to another aspect of the invention, the heat sink has a generally cylindrical, cubic or parallelepipedal or other shape.

The invention also relates to a lighting module comprising:

- a light source,
- a heat sink as defined above, the heat sink being arranged in such a way as to dissipate heat produced by the light source.

According to another aspect of the invention, the light source comprises at least one semiconductor emitting element.

According to another aspect of the invention, the light source is an electroluminescent diode.

According to another aspect of the invention, the light source is arranged directly on the heat sink.

According to another aspect of the invention, the lighting module comprises an electrical connection substrate capable of electrically supplying the light source.

According to another aspect of the invention, the electrical connection substrate is a printed circuit board, a flexible printed board or a variable-geometry interconnection device.

According to another aspect of the invention, the electrical connection substrate is arranged on the heat sink.

According to another aspect of the invention, the light source is arranged on the electrical connection substrate.

According to another aspect of the invention, the connection substrate comprises a through-orifice arranged opposite the air outlet of the heat sink.

The invention moreover relates to a vehicle lighting device, wherein it comprises a housing and closing glass delimiting therebetween an interior volume of the lighting device, and a lighting module as defined above, the lighting module being mounted in a sealed manner across a wall of the housing, one of the first and second openings being located within the interior volume heat sink.

According to another aspect of the invention, the air inlet of the heat sink opens outside of the lighting device and the air outlet of the heat sink opens into the interior volume of the lighting device, the lighting module being received through the wall of the housing in such a way that the air inlet of the heat sink is located below a longitudinal axis of the heat sink and in such a way that the air outlet of the heat sink is located above the longitudinal axis.

According to another aspect of the invention, the device comprises retention means designed to prevent penetration, within the interior volume of the lighting device, of moisture and dust contained in the fluid entering the heat sink of the lighting module.

According to another aspect of the invention, the retention means comprise an inclined wall arranged opposite the air outlet of the heat sink and/or an inclined wall arranged opposite the air inlet of the heat sink.

According to another aspect of the invention, the device comprises a duct for directing fluid to the heat sink, the duct comprising an air inlet and an air outlet located opposite the air inlet of the heat sink, the air outlet being located at height with respect to the air inlet of the duct.

These and other objects and advantages of the invention will be apparent from the following description, the accompanying drawings and the appended claims.

BRIEF DESCRIPTION OF THE ACCOMPANYING DRAWINGS

The invention will be better understood on reading the detailed description that follows, given solely by way of example and with reference to the appended drawings in which.

DETAILED DESCRIPTION OF THE PREFERRED EMBODIMENTS

Figure 1:
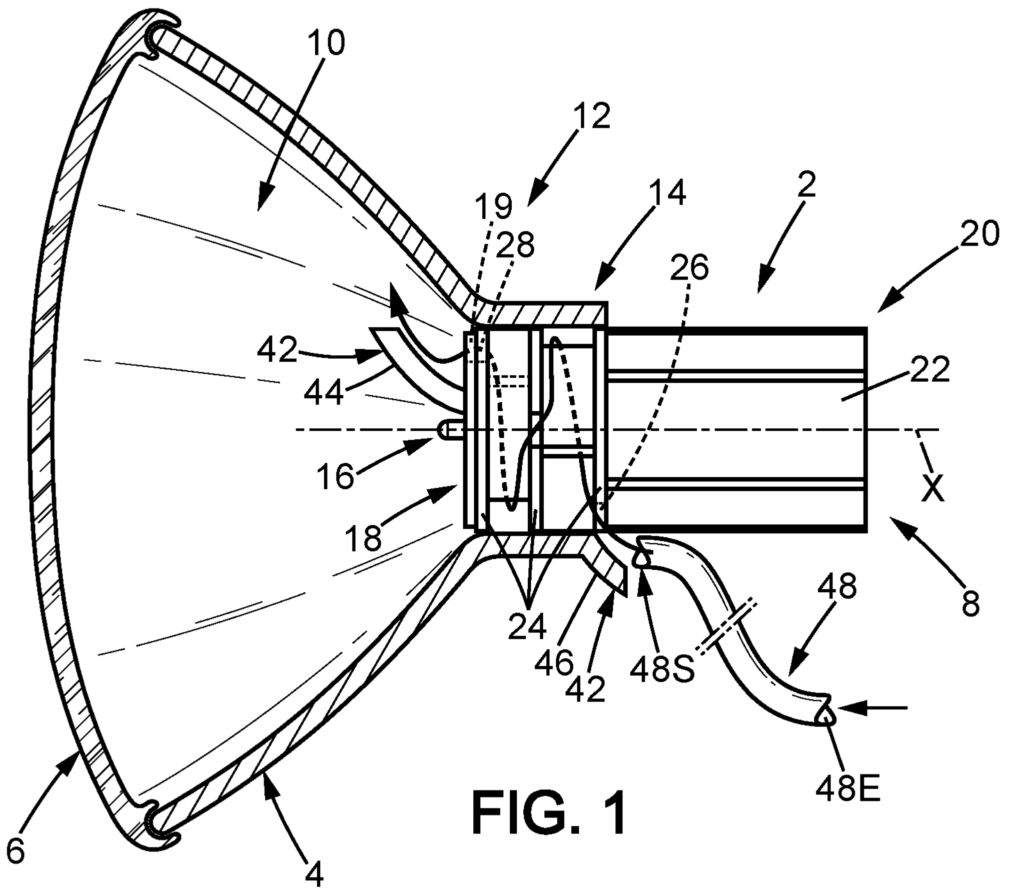
FIG. 1 illustrates a heat sink, a lighting module and a lighting device according to the invention in a partial cross section.

FIG. 1 illustrates a lighting device 2 according to the invention, referred to hereafter as the device 2. The device 2 is intended to be incorporated into a vehicle, such as a car for example. The device 2 is, for example, a projector, or a front headlight, for a vehicle, a signaling device such as an indicator, or else a rear headlight for a vehicle.

Referring to FIG. 1, the device 2 comprises a housing 4, closing glass 6 and a lighting module 8 according to the invention, referred to hereinafter as module 8.

The housing 4 and the closing glass 6 are fixed to each other and delimit an interior volume 10 of the device 2. The housing 4 comprises in particular a rear wall 12 delimiting a receiving orifice 14 for receiving the module 8 in a sealed manner.

The housing 4 is made of a metal or plastic, for example.

The module 8 comprises a light source 16, an electrical connection substrate or printed circuit 18, and a heat sink 20 according to the invention.

The light source 16 is configured in such a way as to emit light. The light source 16 is oriented toward the closing glass 6.

The light source 16 advantageously comprises at least one semiconductor photoemissive element adapted to generate light rays by photoluminescence. In certain modes of embodiment, this emissive element is an electroluminescent diode. It should be noted that the module 8 may comprise a plurality of elements fixed on the printed circuit 18.

The electrical connection substrate 18 is configured in order to supply the light source 16 with electrical energy and control light emission from the light source 16.

The electrical connection substrate 18 comprises a printed circuit card, for example of the printed circuit board (PCB) type, and/or a flexible printed circuit card, for example of the flexible printed circuit board (FPCB) type, and/or a variable-geometry interconnection device, for example of the molded-in device (MID) type. These types of equipment are well known to a person skilled in the art and will not be described any further.

The electrical connection substrate 18 is for example arranged on the heat sink 20. The light source 16 is then arranged on the electrical connection substrate 18. In this mode of embodiment illustrated in FIG. 1, the electrical connection substrate 18 is arranged at the level of a downstream face of the heat sink 20 and is oriented toward the interior volume 10. Furthermore, the electrical connection substrate 18 comprises a through-orifice 19 arranged opposite an air outlet of the heat sink 20. This is described in more detail later.

Alternatively, the light source 16 is arranged directly on the heat sink 20. Advantageously it is then arranged at the level of the downstream face of the heat sink 20.

The heat sink 20 is configured in order to dissipate some of the heat generated by the light source 16 and the electrical connection substrate 18. To this end, the heat sink 20 is made from a material having good thermal conduction properties. For example, the heat sink 20 is made of a metal or plastic having good thermal conduction.

The heat sink 20 extends substantially along a longitudinal axis X. The heat sink 20 has a generally cylindrical shape.

Alternatively, the heat sink 20 has a generally parallelepipedal shape, for example a cubic shape. As another variant, the heat sink 20 has any general shape known to a person skilled in the art.

Figure 2:
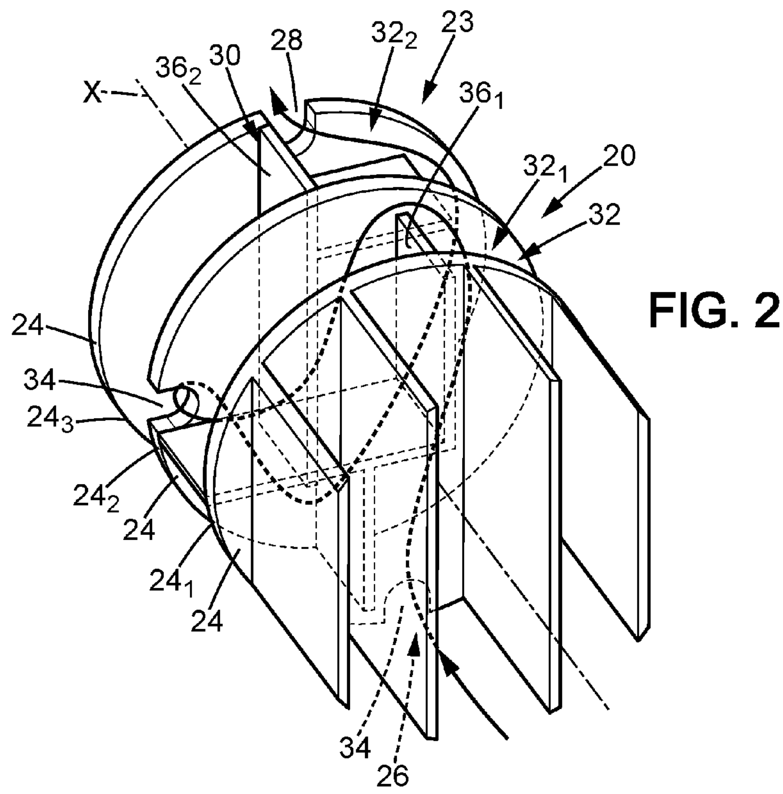
FIG. 2 illustrates a view in perspective of a heat sink according to the invention.

Referring to FIGS. 1 and 2, the heat sink 20 comprises fins 22 configured in order to exchange heat with the external environment and a base 23. Furthermore, the heat sink 20 comprises a first opening or air inlet 26 and a second opening or air outlet 28 fluidly connected to each other. The first and second openings 26, 28 correspond to an air inlet, respectively an air outlet of the heat sink 20. They allow fluid circulation within the heat sink 20 and between the interior volume 10 of the device 2 and the outside of the device 2. Moreover, in the context of the invention, the heat sink 20 comprises at least one deflection means 30.

The base 23 extends substantially along the axis X. The base 23 comprises a plurality of washers 24 spaced apart from each other along the axis X. The heat sink 20 comprises for example a first washer $\mathbf{24}_1$, a second washer $\mathbf{24}_2$ and a third washer $\mathbf{24}_3$. The indexing of the washers $\mathbf{24}_1$, $\mathbf{24}_2$, $\mathbf{24}_3$ is defined in the direction running from the first opening 26 toward the second opening 28 of the heat sink 20, i.e., in the upstream direction toward downstream in view of the fluid circulation within the heat sink 20.

The first washer $\mathbf{24}_1$ defines an upstream face of the heat sink 20. The last washer $\mathbf{24}_3$ defines a downstream face of the heat sink 20. The first opening 26 of the heat sink 20 is located at the level of the upstream face of the heat sink 20, the second opening 28 being located at the level of the downstream face of the heat sink 20.

The washers 24 have for example the general shape of a disk. Moreover, they have substantially the same dimensions. Furthermore, they are disposed substantially orthogonally to the axis X. The spacing between two washers is advantageously substantially constant.

Preferably, the circumferential edges of some or all of the washers 24 define a cylinder having as an axis the axis X in which the corresponding washers 24 are inscribed. It should be noted that it is feasible to employ a first washer $\mathbf{24}_1$ having a different size from that of the other washers 24, for example a larger size.

As a variant, the washers 24 define such a cylinder but have a shape other than a disk shape and/or are not disposed substantially orthogonally to the axis X.

In the context of the invention, two successive washers 24 delimit therebetween a chamber 32 within which air circulates once it has penetrated into the heat sink 20 through the first opening 26. In the example in FIG. 2, the heat sink 20 thus comprises two chambers $\mathbf{32}_1$ and $\mathbf{32}_2$. Two consecutive washers 24 thus form walls transverse to the axis X for the corresponding chamber 32.

Each washer 24 is provided with a recess 34 forming an air inlet or an air outlet for the relevant chamber 32 and possibly for the heat sink 20. The recess 34 of the first washer $\mathbf{24}_1$ thus forms an air inlet for the chamber $\mathbf{32}_1$ delimited thereby and the second washer $\mathbf{24}_2$, while also forming the first opening 26 of the heat sink 20. The recess 34 of the third washer $\mathbf{24}_3$ forms an air outlet of the associated chamber $\mathbf{32}_2$ but also the second opening 28 of the heat sink 20.

Preferably, the recesses 34 are formed at the periphery of the relevant washer 24. For example, each recess 34 is formed on the edge of the corresponding washer 24. Furthermore, for example, each recess 34 is generally C-shaped. Alternatively, each recess 34 is U-shaped or semicircular.

At least one part of the air inlet and at least one part of the air outlet of a given chamber 32 are facing. In other words, the air inlet and the air outlet are at least partially overlapping in a projection along the axis X.

Alternatively, the air inlet and the air outlet of a chamber 32 are not facing.

Figure 3:
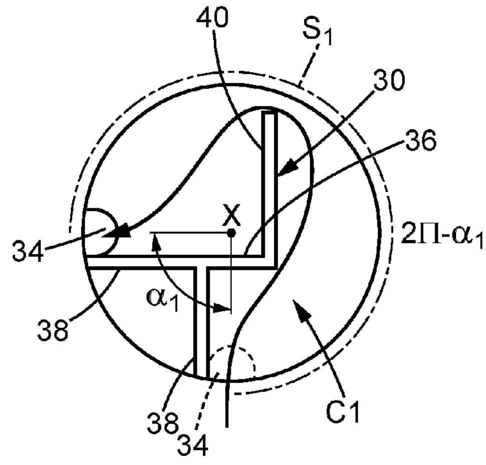
FIGS. 3 and 4 illustrate views in transverse section of the heat sink in FIG. 2.
Figure 4:
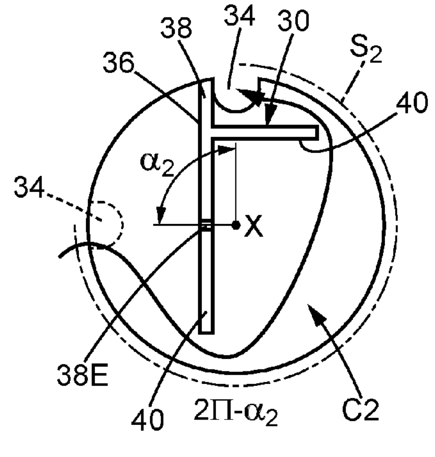

In certain modes of embodiment illustrated in FIGS. 3 and 4 which are cross sections of the first chamber $\mathbf{32}_1$, respectively of the second chamber $\mathbf{32}_2$, the respective recesses 34 of two successive washers 24 are angularly offset about the axis X having an angle $\alpha$, or $\alpha_i$ when there are three or more washers 24 as in the example in FIG. 2, where i indexes the chamber 32 delimited by the two relevant washers 24 (in the sense of the order defined above).

It should be noted that the angle $\alpha_i$ is selected in order to correspond to the smaller of the two angles defined by the two recesses 34 and between 0 and $2\pi$ radians.

The fins 22 form extensions of the heat sink 20 allowing better heat exchange between the air and the heat sink 20, and also better air circulation.

The fins 22 extend substantially parallel to one another. They extend substantially parallel to the axis X. Furthermore, the fins 22 extend from the upstream face $\mathbf{24}_1$ of the heat sink 20 away from the heat sink 20.

Advantageously, the fins 22 and the heat sink 22 are formed as a single piece.

It should be noted that the first opening 26 of the heat sink 20 is advantageously located between the fins 22.

The deflection means 30 is configured in order to connect the washers 24 to one another and to form at least one deflection baffle Ci for the air circulating between the air inlet 26 and the air outlet 28 of the heat sink 20. More specifically, the deflection means 30 is configured in order to form such a baffle Ci in each of the chambers 32.

To this end, the deflection means 30 comprises profiles 36 each extending between two washers 24. In the example in FIG. 2, the deflection means 30 thus comprises two profiles $\mathbf{36}_1$, $\mathbf{36}_2$ extending respectively between the first and second washers $\mathbf{24}_1$, $\mathbf{24}_2$, and between the second and third washers $\mathbf{24}_2$, $\mathbf{24}_3$.

Each profile 36 defines a baffle Ci within the associated chamber 32. Each baffle Ci imposes a path on the air circulating within the corresponding chamber 32 which has an ascending portion. More specifically, this baffle Ci imposes a path on the air circulating between the air inlet 26 and the air outlet 28 of the chamber 32 which, in a projection on a normal plane to the axis X, covers an angular sector $S_i$ the angle of which is substantially equal to $2\pi$-$\alpha_i$ or greater than $2\pi$-$\alpha_i$. The term "substantially equal" in this case should be understood as meaning that the angle of the angular sector $S_i$ corresponds to $2\pi$-$\alpha_i$, to the angular sector covered by a nearby recess (with respect to the axis X), or else to the half-sum of the angular sectors (with respect to the axis X) covered by the recesses forming the air inlet 26 and the air outlet 28 of the relevant nearby chamber 32.

Thus, in the example of FIG. 3, the profile $\mathbf{36}_1$ delimits a baffle C1 which imposes on the air a path the projection of which on the plane in FIG. 3 covers an angular sector having an angle substantially equal to $2\pi-\alpha_i$, where $\alpha_i$ is substantially equal to $\pi/2$ radian. The angle $\alpha_2$ is also substantially equal to $\pi/2$ radian.

The profiles 36 are in the form of pieces extending along a given direction and have a constant transverse section along this direction. In the example in the figures, this direction of the profiles 36 corresponds to the axis X.

Each profile 36 comprises at least one partition wall 38 and at least one deflection wall 40.

The partition wall or walls 38 are configured in order to avoid direct air circulation, i.e. substantially in a straight line, between the air inlet 26 and the air outlet 28 of the associated chamber 32. To this end, each partition wall 38 is arranged in the angular sector defined in a normal projection with respect to the axis X by the air inlet 26 and the air outlet 28 of the chamber 32 and having the angle $\alpha_i$. For example, in FIG. 3, the first profile $\mathbf{36}_1$ comprises two partition walls 38 one of which extends vertically the other of which extends horizontally. These partition walls 38 are arranged in the angular sector defined, in the projection on the plane in FIG. 3, by the recesses 34 of the first washer $\mathbf{24}_1$ and of the second washer $\mathbf{24}_2$. Furthermore, in the example in FIG. 4, the second profile $\mathbf{36}_2$ comprises a partition wall 38 extending vertically.

The deflection walls 40 are configured in order to allow a fluid connection between the air inlet 26 and the air outlet 28 of the associated chamber 32 while forcing the air to bypass same. This has the effect of extending the route taken by the air within the chamber 32, and in particular of increasing the angular sector projected normally to the axis X of this route.

To this end, each deflection wall 40 extends outside of the angular sector defined in a normal projection with respect to the axis by the air inlet 26 and the air outlet 28 of the chamber 32 and having the angle $\alpha_i$. Furthermore, each deflection wall 40 extends away from the recesses 34 of the washers 24 delimiting the relevant chamber 32. Finally, each deflection wall 40 does not extend up to the edge of the washers 24.

Furthermore, preferentially, the partition wall or walls 38 and the deflection wall or walls 40 are formed as a single piece.

In the example in FIG. 3, the profile $\mathbf{36}_1$ comprises a deflection wall 40 extending from the partition walls 38. The end of the deflection wall 40 extends close to an edge of the washer 24 which is spaced apart from the corresponding recesses 34 and from the angular sector defined therebetween in a projection perpendicular to the axis X, but not to the edge (in projection). This allows the air to pass around the deflection wall 40 once the heat sink 20 is mounted in the lighting device 2.

In the example in FIG. 4, the profile $\mathbf{36}_2$ comprises two deflection walls 40 extending from the partition wall 38. One of the deflection walls 40 extends horizontally, the other deflection wall 38 extending vertically from the end 38E of the partition wall 40 and in the extension of the latter. The deflection walls 40 extend close to the edge of the washers 24 (in projection) but not as far as the edge.

Once again referring to FIG. 1, once the module 8 has been arranged in the device 2, the heat sink 20 is received in a sealed manner in the receiving orifice 14. To be more specific, the receiving orifice 14 has a diameter with dimensions substantially equal to the diameter of the heat sink 20. The fluid connection between the inside and the outside of the device 2 is thus possible only through the circulation path defined within the heat sink 20 and passing through the chambers 32.

Furthermore, preferentially, the heat sink 20 is positioned in such a way that the air inlet 26 of the heat sink 20 is located under the axis X. Moreover, the heat sink 20 is preferentially positioned in such a way that the air outlet 28 of the heat sink 20 is located above the axis X.

This allows both an air inlet 26 and an air outlet 28 imposing ascending circulation to be disposed at the air inlet 26, respectively at the air outlet 28 of the heat sink 20, which promotes retention of dust and moisture at the air inlet 26, respectively at the air outlet 28 of the heat sink 20.

It should be noted that FIG. 1 is a partial view in cross section in which the elements of the device 2 are shown in section, with the exception of the heat sink 20, which is illustrated in a side view.

Furthermore, preferentially, the device 2 comprises retention means 42 designed to prevent penetration, within the interior volume 10 of the device 2, of moisture and dust contained in the fluid entering the heat sink 20.

The retention means 42 comprise a wall 44 arranged in the interior volume 10 opposite the air outlet 28 of the heat sink 20. The wall 44 is inclined and has a curved shape, endowing it with the shape of a font. This shape means that the air leaving the heat sink 20 is deflected upward, this deflection increasing the likelihood of moisture and dust being retained by the inclined wall and sliding as far as the low point thereof. The wall 44 is, for example, fixed to the internal face of the housing 4.

Furthermore, the retention means 42 comprise an inclined wall 46 which is arranged opposite the air inlet 26 of the heat sink 20. This wall 46 imposes at the level of the air inlet 26 a rising deflection which has the effect of limiting the penetration of dust and moisture into the heat sink 20, and therefore consequently into the device 2.

The operation of the device 2 will now be described with reference to FIG. 2.

When the device 2 is operating, the module 8 emits light. To this end, the light source 16 is controlled to emit by the electrical connection substrate 18. The operation of the module 8 generates heat which is communicated to the heat sink 20 by conduction. Some of this heat is evacuated by the fins 22.

In parallel to this, air is directed to the heat sink 20. This air comes for example from outside of the vehicle. For example, this directing is produced via a duct or pipe 48, of the device 2 and having an air outlet 48S arranged opposite the air inlet 26 of the heat sink or, where appropriate, opposite the wall 46, this air outlet 48S being located at height with respect to the air inlet 48E of the duct 48. This duct 48 thus also contributes to preventing the ingress of dust and moisture into the heat sink 20.

Once the air has penetrated into the heat sink 20 at the level of the air inlet 26, the air then has imposed on it a deflected route around the profile $\mathbf{36}_1$ and once again exits the first chamber $\mathbf{32}_1$ through the recess 34 of the second washer $\mathbf{24}_2$. Within the second chamber $\mathbf{32}_2$, the air also observes a deflected route because of the profile $\mathbf{36}_2$. The air then exits the heat sink 20 through the air outlet 28, possibly passing across the orifice 19 of the printed circuit 18, and is ejected against the wall 44, which imposes on the air a new rising deflection in order to enter the interior volume 10.

It should be noted that as the air passes through the heat sink 20, the air is heated, which contributes at an earlier stage to limiting the formation of misting on the internal face of the closing glass 6.

The heat sink 20, the module 8 and the device 2 according to the invention have numerous advantages.

Specifically, the deflection of the air path in the heat sink 20 imposed by the deflection means 30 has the effect of increasing the length of the path taken by the air within the heat sink 20, which promotes removal of dust and moisture during passage through the heat sink 20 and before penetration into the interior volume 10 of the device 2.

Furthermore, because the deflection means 30 imposes a route covering an angular sector having an angle substantially equal to $2\pi-\alpha_i$ or greater than $2\pi-\alpha_i$, each deflection baffle C1 formed by the deflection means 30 is translated into the presence, within the air circulation path inside each chamber 32, of a rising portion, which also limits the passage of dust and moisture from one chamber 32 to the other. Moreover, the deflection means 30 has a simple and robust construction, such that the heat sink 20 is both simple to manufacture and has good mechanical performance. Moreover the positioning of the recesses at the periphery of the washers 24 increases at an earlier stage the length of the route taken by the air within the heat sink 20, which also contributes to limiting the penetration of moisture and dust into the interior volume 10.

Other modes of embodiment are feasible. In particular, in certain modes of embodiment, the heat sink 20 may comprise more than two chambers 32 each provided with a profile 36 imposing a deflection on the air between the air inlet 26 and the air outlet 28 of the relevant chamber 32.

Furthermore, in certain modes of embodiment, not all the chambers 32 are necessarily provided with a profile 36 deflecting the air circulation. For example, at least one of the chambers 32 is not provided with a profile 36 forming a deflection, but is simply provided with a connection piece connecting the associated washers 24 to each other and allowing direct circulation, for example substantially in a straight line, between the air inlet 26 and the air outlet 28 of the corresponding chamber 32. This connection piece is, for example, in the form of a rod extending substantially along the axis X.

However, preferentially, each chamber 32 is provided with a profile 36 defining an air deflection baffle C1 as described above.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

What is claimed is:

1. A heat sink for an automobile lighting module, comprising a duct running across said heat sink intended for circulating air from a first opening of said heat sink toward a second opening of said heat sink, said duct comprising at least one circulation chamber, said at least one circulation chamber comprising an air inlet and an air outlet, offset from each other, said duct further comprising at least one deflection means defining, within said at least one circulation chamber, at least one baffle (C1, C2) for deflecting air circulating between said air inlet and said air outlet of said at least one circulation chamber.

2. The heat sink according to claim 1, said heat sink comprising a base extending along a longitudinal axis (X) and comprising two opposing faces along said longitudinal axis (X), including an upstream face and a downstream face, said first and second openings being respectively arranged on said upstream face and said downstream face of said heat sink.

3. The heat sink according to claim 2, wherein said heat sink comprises said base extending along said longitudinal axis (X), said air inlet and said air outlet of said at least one circulation chamber being angularly offset at a given angle ($\alpha$, $\alpha_i$) about said longitudinal axis (X), said given angle ($\alpha$,$\alpha_i$) corresponding to the smaller of the two possible angles of between 0 and $2\pi$ radians, the projection on a normal plane to said longitudinal axis (X) of the air path imposed by said at least one baffle (C1, C2) covering an angular sector (S1, S2) having an angle substantially equal to $2\pi-\alpha_i$ or greater than $2\pi-\alpha_i$, where $\alpha_i$ is said given angle and i is an index indexing said at least one relevant circulation chamber.

4. The heat sink according to claim 3, wherein said deflection means comprises a profile extending between said washers and defining said baffle, said profile comprising at least one partition wall arranged in the angular sector defined in a normal projection with respect to said longitudinal axis (X) by said air inlet and said air outlet of said circulation chamber and having an angle which is the given angle $\alpha_i$, and at least one deflection wall extending outside of said angular sector and spaced apart from said air inlet and said air outlet of said at least one circulation chamber in a projection on a normal plane to said longitudinal axis (X).

5. The heat sink according to claim 3, wherein said heat sink comprises a plurality of circulation chambers each comprising an air inlet and an air outlet, deflection means defining within some or all of said plurality of circulation chambers an air deflection baffle.

6. The heat sink according to claim 2, wherein said heat sink comprises two washers, delimiting therebetween said at least one circulation chamber, said washers each comprising a recess forming said air inlet, respectively said air outlet, of said at least one circulation chamber.

7. The heat sink according to claim 2, wherein said heat sink comprises a plurality of circulation chambers each comprising an air inlet and an air outlet, deflection means defining within some or all of said plurality of circulation chambers an air deflection baffle.

8. The heat sink according to claim 1, wherein said heat sink comprises two washers, delimiting therebetween said at least one circulation chamber, said washers each comprising a recess forming said air inlet, respectively said air outlet, of said at least one circulation chamber.

9. The heat sink according to claim 8, wherein said at least one deflection means comprises a profile extending between said washers and defining said at least one baffle, said profile comprising at least one partition wall arranged in the angular sector defined in a normal projection with respect to said longitudinal axis (X) by said air inlet and said air outlet of said at least one circulation chamber and having an angle which is the given angle $\alpha_i$ and at least one deflection wall extending outside of said angular sector and spaced apart from said air inlet and said air outlet of said at least one circulation chamber in a projection on a normal plane to said longitudinal axis (X).

10. The heat sink according to claim 8, wherein said recess is arranged at a periphery of the corresponding of said two washers.

11. The heat sink according to claim 8, wherein said heat sink comprises said base extending along said longitudinal axis (X), said air inlet and said air outlet of said circulation chamber being angularly offset at a given angle ($\alpha$,$\alpha_i$) about said longitudinal axis (X), said given angle ($\alpha$,$\alpha_i$) corresponding to the smaller of the two possible angles of between 0 and $2\pi$ radians, the projection on a normal plane to said axis (X) of the air path imposed by said at least one baffle (C1, C2) covering an angular sector (S1, S2) having an angle substantially equal to $2\pi-\alpha_i$ or greater than $2\pi-\alpha_i$, where $\alpha_i$ is said given angle and i is an index indexing said at least one relevant circulation chamber.

12. The heat sink according to claim 8, wherein said heat sink comprises a plurality of circulation chambers each comprising an air inlet and an air outlet, deflection means defining within some or all of said plurality of circulation chambers an air deflection baffle.

13. The heat sink according to claim 1, wherein said heat sink comprises a plurality of circulation chambers each comprising an air inlet and an air outlet, deflection means defining within some or all of said plurality of circulation chambers an air deflection baffle.

14. The heat sink according to claim 13, wherein said heat sink extends substantially along a longitudinal axis, and in that each of said plurality of circulation chambers within which is delimited said air deflection baffle is axially delimited by two washers of said heat sink, each of said two washers comprising a recess forming an air inlet or an air outlet for said relevant plurality of circulation chambers, said air inlet and said air outlet being angularly offset by a given angle ($\alpha_i$) about said longitudinal axis (X), said given angle corresponding to a smaller of two possible angles of between 0 and $2\pi$ radians, the projection on a normal plane to said axis of the air path imposed by said air deflection baffle (C1, C2) covering an angular sector having an angle substantially equal to $2\pi-\alpha_i$ or greater than $2\pi-\alpha_i$, where $\alpha_i$ is said given angle and i is an index indexing said relevant circulation chamber.

15. The heat sink according to claim 14, wherein said deflection means comprises, for each of said plurality of circulation chambers comprising said air deflection baffle (C1, C2), a profile extending between said two washers delimiting said relevant plurality of circulation chambers and defining said corresponding deflection baffle, said profile comprising at least one partition wall arranged in the angular sector defined in a normal projection with respect to said longitudinal axis (X) by said air inlet and said air outlet of said corresponding circulation chamber and having said given angle $\alpha_i$ between said associated recesses, and at least one deflection wall extending outside of said angular sector and spaced apart from said air inlet and from said air outlet of said plurality of circulation chambers in a projection on said normal plane to said axis of said heat sink.

16. The heat sink according to claim 1 comprising cooling fins.

17. The heat sink according to claim 16, wherein said first opening is disposed between said cooling fins.

18. A lighting module comprising:

a light source, a heat sink according to claim 1, said heat sink being arranged in such a way as to dissipate heat produced by said light source.

19. A vehicle lighting device, comprising a housing and closing glass delimiting therebetween an interior volume of said lighting device, and a lighting module as claimed in claim 18, said lighting module being mounted in a sealed fashion across a wall of said housing, one of said first and said second openings being located within said interior volume.

20. A vehicle lighting device as claimed in claim 19, wherein said vehicle lighting device comprises retention means designed to prevent penetration, within said interior volume of said vehicle lighting device, of moisture and dust contained in the fluid entering said heat sink of said vehicle lighting module.

* * * * *